(No Model.)
C. F. LEOPOLD.
KNIFE FOR MEAT CUTTERS AND SIMILAR MACHINES.
No. 431,230. Patented July 1, 1890.
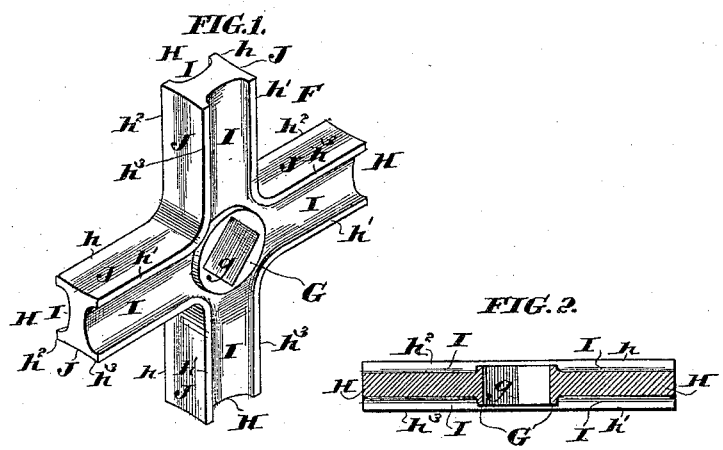
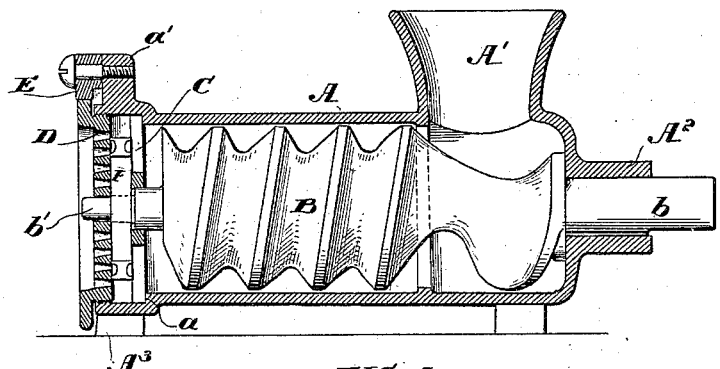
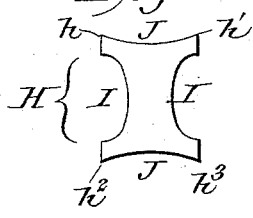
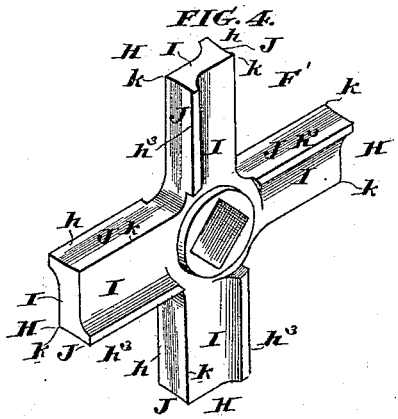
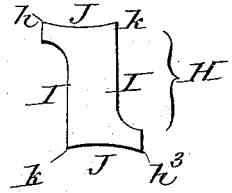
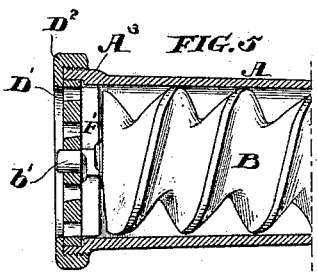
WITNESSES:
David S. Williams
H. F. Graybill
INVENTOR:
Charles F. Leopold
by his attorney
Francis T. Chambers

UNITED STATES PATENT OFFICE.

CHARLES F. LEOPOLD, OF PHILADELPHIA, PENNSYLVANIA, ASSIGNOR TO WILLIAM J. LLOYD, OF SAME PLACE.

KNIFE FOR MEAT-CUTTERS AND SIMILAR MACHINES.

SPECIFICATION forming part of Letters Patent No. 431,230, dated July 1, 1890.

Application filed May 6, 1890. Serial No. 350,820. (No model.)

*To all whom it may concern:*

Be it known that I, CHARLES F. LEOPOLD, of Philadelphia, county of Philadelphia, State of Pennsylvania, have invented a certain new and useful Improved Knife for Meat-Cutters and Similar Machines, of which the following is a true and accurate description, reference being had to the drawings which form a part of this specification.

My invention relates to the construction of the knives used in machines for cutting up plastic substances, and of the general character of the machines shown and described in my patent, No. 348,132, of August 24, 1886, and in Baker's patent, No. 339,833, of April 13, 1886. The leading features of such machines are a casing having a hopper at one end to receive the meat or other substance to be cut up, and an opening at their delivery end, a perforated terminal plate at the delivery end of the cylinder or casing, a knife working on the inside of and against the terminal plate to cut up the meat or other substance, and a feed-screw working in the casing to force the substance under treatment against and through the plate. Generally, as in the patents referred to, the plate is stationary and the knife revolves with the screw; but in some machines the plate is revolved and the knife remains stationary.

As heretofore constructed the knives used with machines of the above-noted character have been so formed that they acted like wedges in forcing back the meat not cut off by them against the feed-screw, thus interfering with the continuous feeding of the meat and consuming power uselessly. This is a defect which my present invention aims to overcome. Said knives have also been so constructed that they require to be placed in the machine in a certain position, and another object of my invention is to construct them so that they will be reversible, thus at the same time insuring that the most unskillful will place them in correct position, and providing a double set of cutting-edges, which, of course, doubles the effective life of the knife.

In connection with my preferred construction of machine—that shown in my own patent above referred to—my improved knife has other and very marked advantages, to which attention will be hereinafter called.

Reference is now had to the drawings, which illustrate my invention, and in which—

Figure 1 is a perspective view of my improved knife in the preferred form. Fig. 2 is a sectional side view of the knife. Fig. 3 is a longitudinal sectional view through my meat-cutting machine, showing the improved knife in position. Fig. 4 is a perspective view of a modification of my knife adapted for use with the Baker type of machine. Fig. 5 is a longitudinal sectional view through the end of a Baker machine, showing the knife in position. Fig. 6 is an end view, on a larger scale, of one arm of the knife shown in Fig. 1; and Fig. 7 is an end view of one arm of the knife shown in Fig. 4.

A is the cylinder or casing of the machine; A', its hopper; A², a journal in its back end for the end of the feed-screw; and A³, its open delivery end, which in Fig. 3 is internally and in Fig. 5 externally threaded.

B is the feed-screw, having a rear extension $b$, to which the handle (not shown) is connected, and a front extension $b'$, which, as shown, is required to pass through and engage the knives.

C, Fig. 3, is a plate with perforations formed through it, which fits against a shoulder $a$ of the casing; and D is a perforated plate screwing in the end of the casing, while F is the knife, which, as shown, is clamped between the plates C and D.

The lug $a'$ and catch E (shown in Fig. 3) are devices described in my former patent and need not be further noted.

In Fig. 5 the knife (here marked F') sets against the end of the screw B, and is clamped down against it by a perforated plate D', fitting in the end of the cylinder and held in place by a ring D², screwing on the outside of its end A³.

Referring now to the construction of my new knife, G is its hub, which is formed with a socket to receive the end of the screw, and from which extend a number of radial arms H H, &c., the upper and lower faces of which have cutting-edges formed thereon in parallel planes and in such a way as to make the knife reversible. When my knife is to be used between plates, as C and D, its arms are made of a generally-quadrangular section, as shown in Fig. 1, and cutting-edges $h$, $h'$, $h^2$, and $h^3$ are formed at each corner. When the knife is intended for use in connection with but one plate, as in Fig. 5, it is sufficient to form cutting-edges only on the diagonally-opposite corners $h$ and $h^3$. The upper and lower faces I I of the arms H are formed, as shown, with longitudinal grooves in them extending close to the cutting-edges, so that only a narrow strip of the arm inside the cutting edge or edges comes in contact with the plate or plates. The front and rear or faces J of the arms are, as shown, formed so that at the top and bottom they will lie in, or substantially in, a plane passing through the axis of the hub. These faces are preferably hollow ground, as shown, so as to give the cutting-edge a sharper angle, and in case of the knife-like modification F, Fig. 4, the edges there marked $k$ may even extend beyond the cutting-edges. This feature of the construction of the front or face of the cutter-arms avoids the tendency heretofore existing in the knife-arms to force or wedge the meat away from the plate, and insures its being carried around in front of the cutting-edges until the pressure behind it forces it into the perforations of the plate, when, of course, it is cut off. This feature of construction is obviously applicable to non-reversible knives, as well as reversible ones, and to obtain its full advantage it is desirable to make knives which cut only against one plate, but are reversible, of the substantially quadrangular form shown in Fig. 1.

A great advantage of my knife, as used with the double plates C and D, is that the two cutting-edges not in use are sharpening themselves against the plates while the other two edges are cutting, so that sharp edges can always be secured by reversing the knife after it has been in use for a short time. Preferably the hub G should be of less thickness than the arms. This would be practically essential were the plates not slightly recessed when the hub comes over them, and is in any case desirable, so that the knives can be ground readily and accurately, and this grinding is also facilitated by grooving the upper and lower parts $l$ of the arms.

Having now described my invention, what I claim as new, and desire to secure by Letters Patent, is—

1. A knife for meat-cutters and similar machines having a perforated plate at their delivery end, consisting of a hub provided with a socket to receive the end of the feed-screw, and radial arms extending from said hub having cutting-edges formed thereon to work against the terminal plate, and having also overhanging edges above the cutting-edges lying substantially in a plane drawn through the cutting-edges and parallel to the axis of the hub.

2. A reversible knife for meat-cutting and similar machines, consisting of a central hub having a socket formed in it to receive the end of the feed-screw, arms extending from said hub, and similar cutting-edges $h\ h^3$, formed on opposite transverse edges of the arms in parallel planes, said arms having also longitudinal grooves I, formed close inside the cutting-edges, all substantially as and for the purpose specified.

3. A reversible knife for meat-cutting and similar machines, consisting of a central hub having a socket formed in it to receive the end of the feed-screw, arms of greater vertical thickness than the hub extending from said hub, and similar cutting-edges $h\ h^3$, formed on opposite transverse edges of the arms in parallel planes, said arms having also longitudinal grooves I, formed close inside the cutting-edges, all substantially as and for the purpose specified.

4. A reversible knife for meat-cutting and similar machines, consisting of a central hub having a socket formed in it to receive the end of the feed-screw, arms extending from said hub, and similar cutting-edges $h\ h^3$, formed on opposite transverse edges of the arms in parallel planes, said arms having also longitudinal grooves I, formed close inside the cutting-edges and their faces formed in a plane parallel to the axis of the hub and hollow ground to give the cutting-edges an acute angle, all substantially as and for the purpose specified.

5. A reversible knife for meat-cutting and similar machines, consisting of a central hub having a socket formed in it to receive the end of the feed-screw, arms of substantially quadrangular section extending from said socket, cutting-edges $h\ h'$ and $h^2\ h^3$, formed at each angle and on parallel planes, and longitudinal grooves I I, formed on the front and rear faces of the arms and extending close to the edges thereof, all substantially as and for the purpose specified.

6. A reversible knife for meat-cutting and similar machines, consisting of a central hub having a socket formed in it to receive the end of the feed-screw, arms of substantially quadrangular section extending from said socket, cutting-edges $h\ h'$ and $h^2\ h^3$, formed at each angle and on parallel planes, longitudinal grooves I I, formed in the front and rear faces of the arms and extending close to the cutting-edges thereof, and concave grooves J J, extending in a continuous curve from face to face of the arms, all substantially as and for the purpose specified.

7. A reversible knife for meat-cutting and similar machines, consisting of a central hub having a socket formed in it to receive the end of the feed-screw, arms of greater vertical thickness than the hub and of substantially quadrangular section extending from said socket, cutting-edges $h\ h'$ and $h^2\ h^3$, formed at each angle and on parallel planes, longitudinal grooves I I, formed in the front
5 and rear faces of the arms and extending close to the cutting-edges thereof, and concave grooves J J, extending in a continuous curve from face to face of the arms, all substantially as and for the purpose specified.

CHARLES F. LEOPOLD.

Witnesses:
 LISLE STOKES,
 W. S. LLOYD.